United States Patent

Miyasaka

[11] Patent Number: 5,882,821
[45] Date of Patent: Mar. 16, 1999

[54] LITHIUM ION SECONDARY BATTERY

[75] Inventor: Tsutomu Miyasaka, Kanagawa, Japan

[73] Assignee: Fuji Photo Film Co., Ltd., Kanagawa, Japan

[21] Appl. No.: 805,058

[22] Filed: Feb. 24, 1997

[30] Foreign Application Priority Data

| Feb. 23, 1996 | [JP] | Japan | 8-062124 |
| Feb. 27, 1996 | [JP] | Japan | 8-039564 |
| Nov. 29, 1996 | [JP] | Japan | 8-335113 |

[51] Int. Cl.$^6$ ................................ H01M 4/50
[52] U.S. Cl. ............................ 429/224; 205/59
[58] Field of Search .................. 429/224, 218, 429/221; 423/599; 205/59

[56] References Cited

U.S. PATENT DOCUMENTS

| 5,316,877 | 5/1994 | Thackeray et al. | 429/224 X |
| 5,370,948 | 12/1994 | Hasegawa et al. | 429/224 X |
| 5,478,673 | 12/1995 | Funatsu | 429/218 X |
| 5,639,438 | 6/1997 | Ellgen | 429/224 X |

*Primary Examiner*—Stephen Kalafut
*Attorney, Agent, or Firm*—Sughrue, Mion, Zinn, Macpeak & Seas, PLLC

[57] ABSTRACT

In a lithium ion secondary battery having a positive electrode, a negative electrode, a non-aqueous electrolyte, and a container sealing the electrodes and electrolyte therein, the positive electrode is formed of a positive electrode active material which is produced by electrochemically intercalating a lithium ion into a lithium manganese-metal complex oxide in the container to give a positive electrode active material precursor comprising a lithium manganese-metal complex oxide of which lithium ion content is increased, and then releasing a lithium ion from the positive electrode active material precursor in the container, and the negative electrode is formed of a negative electrode active material which is produced by intercalating the released lithium ion into a negative electrode active material precursor of a metal oxide in the container.

4 Claims, 1 Drawing Sheet

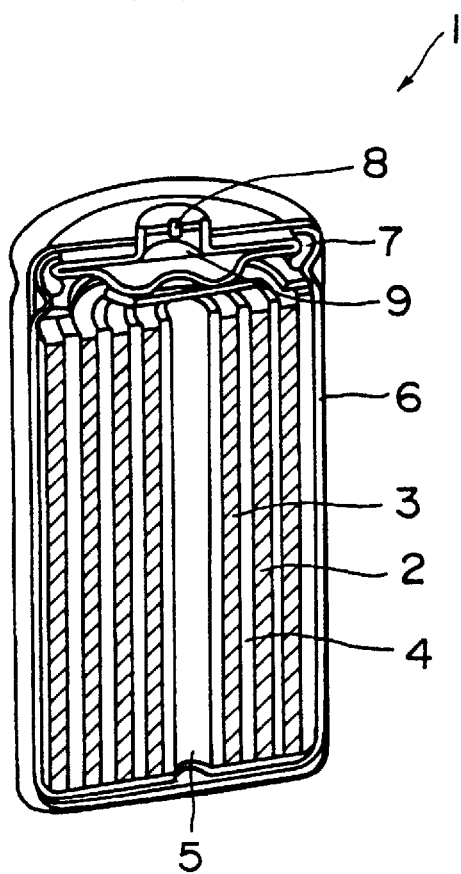

LITHIUM ION SECONDARY BATTERY

FIELD OF THE INVENTION

This invention relates to a lithium ion secondary battery and a precursor for producing the lithium ion secondary battery.

BACKGROUND OF THE INVENTION

A lithium ion secondary battery is known as an advantageous secondary battery which is able to give a high voltage of about 4 volts and a high discharge capacity. As the positive electrode active material of the lithium ion secondary battery, $LiMn_2O_4$ having a spinel crystal structure, as well as $LiMnO_2$, $LiCoO_2$, $LiCo_{1-x}Ni_xO_2$ or $LiNiO_2$ which has a rock salt crystal structure have been generally employed. The $LiCoO_2$ having the rock salt crystal structure shows higher voltage and higher discharge capacity than other oxides and therefore is advantageous. However, the $LiCoO_2$ has such drawbacks that cobalt is high in its cost and less available than other metals, and moreover may cause environmental pollution if battery wastes containing the lithium cobalt oxide are left outside.

Japanese Patent Provisional Publication H3(1991)-147276 proposes a lithium ion secondary battery using $LiMn_2O_4$ of the spinel crystal structure as the material for its positive electrode, that is, cathode. Manganese is less expensive and easily available, and moreover scarcely causes environmental pollution. However, $LiMn_2O_4$ gives a charge capacity (corresponding to amount of releasable lithium ions) per unit volume less than $LiCoO_2$ by 10 to 20%. This means that if the $LiMn_2O_4$ is combined with a negative electrode active material of high capacity to prepare a secondary battery, the volume of the $LiMn_2O_4$ (namely, positive electrode active material) to be used should be increased so as to balance its capacity with the high capacity of the negative electrode active material. As a result, the amount of the negative electrode active material encased in a container of a battery should be reduced, and then the battery capacity lowers.

Japanese Patent Provisional Publication H4(1992)-147573 describes a lithium ion secondary battery using $Li_{1+x}Mn_2O_4$ (x>0) as the positive electrode active material precursor in combination of a negative electrode active material precursor such as carbonaceous material. Such positive electrode active material precursor-negative electrode active material precursor combination in a container of a battery is electrochemically converted into a positive electrode active material-negative electrode active material combination by electrically charging thus prepared battery so as to release a lithium ion from the positive electrode active material precursor and intercalate the released lithium ion into the negative electrode active material precursor in the container.

The $Li_{1+x}Mn_2O_4$ having a lithium ion in an amount of higher than $LiMn_2O_4$ is advantageous because it gives a charge capacity higher than $LiMn_2O_4$. In the lithium ion secondary battery disclosed in the last Publication, the positive electrode active material of $Li_{1+x}Mn_2O_4$ is prepared electrochemically in an electrochemical cell and collected as a bulk product outside the cell, or it is prepared chemically in a known process outside the cell. The product is then incorporated into an elecrode composition in a container of a final battery form. $Li_{1+x}Mn_2O_4$ is known to be extremely unstable and easily oxidized. Therefore, this process and the secondary battery prepared by this process may cause problems in industrial preparation and use.

SUMMARY OF THE INVENTION

It is a primary object of the present invention to provide a lithium ion secondary battery which gives a high voltage and high discharge capacity.

It is another object of the present invention to provide a lithium ion secondary battery which is easily prepared without problems attached to the lithium ion secondary battery of prior art.

It is a further object of the invention to provide a lithium ion secondary battery which is easily prepared with high reliability and reproductivity.

It is a still further object of the invention to provide a lithium ion secondary battery which is easily prepared with improved cost-performance.

In one aspect, the present invention resides in a lithium ion secondary battery comprising a positive electrode, a negative electrode, a non-aqueous electrolyte, and a container sealing the electrodes and electrolyte therein, wherein the positive electrode comprises a positive electrode active material of the formula (I):

$$Li_yMn_{2-a}M_{a/c}O_{4+b} \tag{I}$$

wherein M is cation of a metal other than Li and Mn; y, a and b are numbers satisfying the conditions of $0<y\leq1.0$, $0<a\leq1.0$, and $0\leq b<0.4$, respectively; and c is a number of 1 to 4, which is produced by electrochemically intercalating a lithium ion into a lithium manganese-metal complex oxide in the container to give a positive electrode active material precursor comprising a lithium manganese-metal complex oxide of which lithium ion content is increased and which has the formula (II):

$$Li_{1+x}Mn_{2-a}M_{a/c}O_{4+b} \tag{II}$$

wherein M, a, b and c are the same as above; and x is a number satisfying the condition of $0.3<x<1.2$, and then releasing a lithium ion from the positive electrode active material precursor in the container; and the negative electrode comprises a negative electrode active material which is produced by intercalating the released lithium ion into a negative electrode active material precursor comprising a metal oxide in the container.

In another aspect, the invention resides in a lithium ion secondary battery precursor comprising a positive electrode precursor, a negative electrode precursor, a non-aqueous electrolyte, and a container sealing the electrode precursors and electrolyte therein, wherein the positive electrode precursor comprises a positive electrode active material precursor which has the formula (II):

$$Li_{1+x}Mn_{2-a}M_{a/c}O_{4+b} \tag{II}$$

wherein M is cation of a metal other than Li and Mn; x, a and b are numbers satisfying the conditions of $0.3<x<1.2$, $0<a\leq1.0$, and $0\leq b<0.4$, respectively; and c is a number of 1 to 4, and which is produced by electrochemically intercalating a lithium ion into a lithium manganese-metal complex oxide in the container to increase lithium ion content of the lithium manganese-metal complex oxide; and the negative electrode precursor comprises a negative electrode active material precursor comprising a metal oxide.

A further object of the invention resides in a lithium ion secondary battery precursor comprising a material for positive electrode precursor, a negative electrode precursor, a non-aqueous electrolyte, and a container sealing the precursors and electrolyte therein, wherein the material for positive electrode precursor comprises a lithium manganese-metal complex oxide containing cation of a metal other than Li and Mn, and has a lithium metal or a lithium alloy in the vicinity of the material under the condition that the lithium metal or its alloy is in electric contact with the material; and the negative electrode precursor comprises a negative electrode active material precursor comprising a metal oxide.

In a still further aspect, the invention resides in a lithium ion secondary battery precursor comprising a material for positive electrode precursor, a negative electrode precursor, non-aqueous electrolyte, and a container sealing the electrode precursors and electrolyte therein, wherein the material for positive electrode precursor comprises a lithium manganese-metal complex oxide containing cation of a metal other than Li and Mn; and the negative electrode precursor comprises a negative electrode active material precursor comprising a metal oxide, and has a lithium metal or its alloy in the vicinity of the negative electrode active material precursor under the condition that the lithium metal or its alloy is brought into electric contact with the material for positive electrode precursor through an externally set electric circuit.

In a still further aspect, the invention resides in a positive electrode active material precursor for a lithium ion secondary battery which has the formula (II):

$$Li_{1+x}Mn_{2-a}M_{a/c}O_{4+b} \quad (II)$$

wherein M is cation of a metal other than Li and Mn; x, a and b are numbers satisfying the conditions of $0.3<x<1.2$, $0<a\leq1.0$, and $0\leq b<0.4$, respectively; and c is a number of 1 to 4, and has a spinel crystal structure.

In a still further aspect, the invention resides in a lithium ion secondary battery precursor comprising a positive electrode active material precursor of the formula (II):

$$Li_{1+x}Mn_{2-a}M_{a/c}O_{4+b} \quad (II)$$

wherein M is cation of a metal other than Li and Mn; x, a and b are numbers satisfying the conditions of $0.3<x<1.2$, $0<a\leq1.0$, and $0\leq b<0.4$, respectively; and c is a number of 1 to 4, a negative electrode active material precursor containing essentially no lithium, and a non-aqueous electrolyte, and a container sealing the electrode precursors and electrolyte therein.

In a still further aspect, the invention resides in a process for preparing a lithium ion secondary battery which comprises electrically charging a non-aqueous secondary battery precursor comprising a positive electrode active material precursor having the formula (II):

$$Li_{1+x}Mn_{2-a}M_{a/c}O_{4+b} \quad (II)$$

wherein M is cation of a metal other than Li and Mn; x, a and b are numbers satisfying the conditions of $0.3<x<1.2$, $0<a\leq1.0$, and $0\leq b<0.4$, respectively; and c is a number of 1 to 4,
a negative electrode active material precursor, a non-aqueous electrolyte, and a container sealing the electrode precursors and electrolyte therein, to convert the positive electrode active material precursor into a positive electrode active material of the formula (I):

$$Li_y Mn_{2-a}M_{a/c}O_{4+b} \quad (I)$$

wherein M, a, b and c are the same as above, and y is a number satisfying the condition of $0<y\leq1.0$, and the negative electrode active material precursor into a negative electrode active material having a lithium ion inserted therein.

BRIEF DESCRIPTION OF THE DRAWINGS

FIGURE is a schematic section of a typical lithium ion secondary battery according to the invention.

PREFERRED EMBODIMENTS OF THE INVENTION

The preferred embodiments of the lithium ion secondary battery of the invention and the lithium ion secondary battery precursor (which is converted into the lithium ion secondary battery of the invention by an electrochemical process) are set forth below.

1) "x" of the formula (II) is a number satisfying the condition of $0.5<x<1.0$.

2) "a" of the formulas (I) and (II) is a number satisfying the condition of $0.01\leq a<0.1$.

3) "b" of the formulas (I) and (II) is a number satisfying the condition of $0\leq b\leq0.3$.

4) "M" of the formulas (I) and (II) is cation of a transition metal.

5) "M" of the formulas (I) and (II) is cation of a transition metal selected from the group consisting of Co, Fe, and Nb.

6) The positive electrode contains, as a sub-active material, lithium cobalt oxide having the formula of $Li_x CoO_2$ under the condition of $0.5<x\leq1$, or lithium nickel or cobalt-nickel oxide having the formula of $Li_x Co_y Ni_z O_2$ under the conditions of $0.5<x\leq1$, $0\leq y\leq1$, and $0<z\leq1$.

7) The lithium manganese-metal complex oxide of the formula (II) is produced in the container by electrochemical self-discharge between a lithium manganese-metal complex oxide containing cation of a metal other than Li and Mn and a lithium metal or its alloy.

8) The lithium manganese-metal complex oxide of the formula (II) is produced in the container by electrochemical discharge between a lithium manganese-metal complex oxide containing cation of a metal other than Li and Mn and a lithium metal or a lithium alloy which is placed near the negative electrode active material precursor, utilizing an externally set electric circuit.

9) The negative electrode active material precursor comprises an amorphous metal oxide which has a tin atom and at least one other metal atom and into which the lithium ion has been intercalated.

10) The negative electrode active material precursor comprises an amorphous metal oxide which has a tin atom and at least one other metal atom and which is represented by the formula of $SnL_k O_z$ in which L is at least one atom selected from the group consisting of Al, B, P, Si, Li, Na, K, Rb, Cs, Be, Mg, Ca, Sr, Ba, Sc, Y, lanthanides, and halogens, and k and z are numbers satisfying the condition of $0.2\leq k\leq2$ and $1\leq z\leq6$, respectively, or the formula of $Sn_d Q_{1-d} L_k O_z$ in which Q is a transition metal atom, L is at least one atom selected from the group consisting of Al, B, P, Si, Li, Na, K, Rb, Cs, Be, Mg, Ca, Sr, Ba, Sc, Y, lanthanides, and halogens, and d, k and z are numbers satisfying the condition of $0.1\leq d\leq0.9$, $0.2\leq k\leq2$, and $1\leq z\leq6$, respectively.

11) The ratio of the amount of lithium ion to be released from the negative electrode active material until the discharge voltage of the battery lowers to 3 V in a discharge step, to the amount of lithium ion intercalated into the negative electrode active material precursor is lower than $1/(1+x)$.

The positive electrode active material precursor for the lithium ion secondary battery according to the invention is a lithium-manganese metal complex oxide which has a spinel crystal structure and a stoichiometric or non-stoichiometric composition of the following formula:

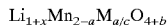

In the above formula, "M" is cation of a metal other than Li and Mn.

"M" is a dope element for Mn and preferably is cation of a divalent to tetravalent transitional metal. Preferred transition metals include Co, Ni, Fe, Cr, Cu and Ti. The cation can be a cation of at least one of these elements. From the viewpoint of storage stability, atomic elements other than the transition metal, such as Zr, Nb and Y, are preferred. From the same viewpoint, lanthanide elements such as La, Sm and Eu are also preferably employed. For the improvement of charge-discharge cycle-life and storage stability, M can be cation of an alkali metal or an alkaline earth metal such as Na, K, Ca, Mg, or Cs. Most preferable cations for "M" in the invention include divalent cations of Co, Fe, and Nb.

In the formula, "x" is a number satisfying the condition of $0.3<x<1.2$. If x is more than 1.2, the structure of the precursor becomes unstable in its reversible release and intercalation of lithium. Preferred range is $0.5<x<1.0$.

"a" is a number satisfying the condition of $0<a\leq1.0$. The dope ratio of M per Mn preferably is so low as to obviate decrease of activity of the active material. Therefore, the range of $0<a\leq0.1$ is preferred, and $0.01<a\leq0.1$ is most preferred. "b" is a number satisfying the condition of $0\leq b<0.4$, preferably $0\leq b<0.3$. "c" is a number of 1 to 4. "c" preferably is a number of 1 to 3, more preferably 2 to 3. The most preferred number for "c" is 2.5. The "a/c" which means a dope ratio of M to Mn, as well as "4+b" which means the content of oxygen, defines the oxygen number of Mn in the active material. The more "c" increases and therefore "a/c" decreases, the oxygen number of Mn increases. The oxygen number of Mn preferably is within 3.45 to 4.0 in the course of charge-discharge cycle wherein "x" which means the Li content in the active material varies within $0<x\leq1.0$. Particularly, the oxygen number of Mn preferably is more than 3.5 so as to prolong the charge-discharge life of the battery. Therefore, "c" preferably is 2 or more so that the oxygen number of Mn can be in the range of 3.5 to 4.0.

The positive electrode active material precursor of the invention preferably is an oxide having a spinel crystal structure, which give a high voltage.

The oxide of spinel type has a crystal structure of $A(B_2)O_4$, in which oxygen anions are arranged at the tops of tetragonal and hexagonal planes of the cubic close-packed structure. Based on the arrangements of the cation "A", the spinel structures are classified into a regular (or normal) spinel, that is, $A(B_2)O_4$, and a reverse spinel, that is, $A(A,B)O_4$. There is an intermediate spinel structure, that is, $A_x, B_y(A_{1-x}, B_{1-y})O_4$. A representative lithium manganese oxide of the regular spinel is $LiMn_2O_4$. In this structure, a half of Mn cations are trivalent and another half are tetravalent. $\lambda$-$MnO_2$, that is a known active material, has the crystal structure of $LiMn_2O_4$ from which lithium is removed, that is called a defective spinel structure, as is described in U.S. Pat. No. 4,246,253. In this crystal structure, all Mn cations are all tetravalent. The lithium manganese-metal complex oxide employed in the invention can have any spinel structures, such as regular spinel, reverse spinel, intermediate spinel, and defective spinel including a spinel of non-stoichiometric composition.

Hereinbelow, processes for preparing the positive electrode active material precursor of the aforementioned formula are described.

The positive electrode active material precursor of the invention can be produced in a container of a lithium ion secondary battery by reaction between a composition comprising lithium, manganese, a metal other than lithium and manganese, and oxygen (this composition is named a material for positive electrode active material precursor), and a lithium metal.

In more detail, the positive electrode active material precursor of the invention can be electrochemically produced in a container of battery from lithium metal (or lithium alloy) and a lithium manganese-metal complex oxide of $Li_eMn_{2-a}M_{a/c}O_{4+b}$ [wherein M is cation of a metal other than Li and Mn; e, a, and b are numbers satisfying the conditions of $0.7<e<1.3$, $0<a\leq1.0$, and $0\leq b<0.4$, respectively; and c is a number of 1 to 4] which is previously prepared outside the container.

The lithium manganese-metal complex oxide of the above-mentioned formula, i.e., $Li_eMn_{2-a}M_{a/c}O_{4+b}$, can be produced by a conventional method such as a solid-phase reaction of a lithium salt, a manganese salt or a manganese oxide, and other metal salt or oxide at an elevated temperature. If lithium carbonate and manganese dioxide are employed, the reaction can be performed at a temperature of 350° to 900° C., preferably 350° to 500° C., for a period of 8 to 48 hours. If lithium hydroxide and manganese dioxide are employed, the reaction can be performed at a temperature of 350° to 800° C., preferably 400° to 750° C., for a period of 8 to 48 hours. If lithium nitrate (having a low melting temperature of 261° C.) is employed, the reaction temperature can be in the range of 300° to 900° C., preferably 300° to 500° C. Examples of employable manganese oxides include $\lambda$-$MnO_2$, $MnO_2$ produced by electrolytic synthesis (EMD), chemically produced $MnO_2$ (CMD), and their mixtures. As a raw material for the lithium component, a lithium manganese oxide (such as $Li_2Mn_4O_9$) also can be employed. The lithium manganese oxide can be mixed with a manganese compound such as manganese dioxide and fired at a temperature of 350° to 500° C.

The above-described lithium manganese oxide can be employed in combination with one or more of other lithium manganese oxides such as $LiMnO_2$ of the rock salt crystal structure and $Li_{1+x}Mn_2O_4$ ($0\leq x\leq0.5$, which is produced by chemically inserting Li ion into $LiMn_2O_4$), and $Li_{1-x}Mn_2O_4$ ($0\leq x\leq0.5$, which is produced by chemically removing Li ion from $LiMn_2O_4$).

The lithium manganese-metal complex oxide produced as above preferably is a crystalline product, but may be a low crystalline or amorphous product. Otherwise, a mixture of a crystalline product and an amorphous product can be employed.

According to the invention, the positive electrode active material precursor ($Li_{1+x}Mn_{2-a}M_{a/c}O_{4+b}$) is produced in the container by electrochemical self-discharge between the lithium manganese-metal complex oxide prepared in the above and a lithium metal or a lithium alloy. Otherwise, the positive electrode active material precursor is produced in the container by electrochemical discharge between the lithium manganese-metal complex oxide and a lithium metal or its alloy which is placed near the negative electrode active material precursor, utilizing an externally set electric circuit. Details are described below.

(1) Use of lithium metal or alloy arranged on positive electrode side

This process can be performed by one of the following processes.

1) The lithium metal or its alloy is deposited on an electric collector of positive electrode having the lithium manganese-metal complex oxide thereon to give an electric contact between the lithium metal or alloy and the lithium manganese-metal complex oxide. Thus arranged electrode material is then subjected to self discharging reaction in the presence of an electrolytic solution.

2) The lithium metal or its alloy in the form of film is deposited directly on the surface of the lithium manganese-metal complex oxide provided on the collector. Thus arranged electrode material is then subjected to self discharging reaction in the presence of an electrolytic solution.

3) The lithium metal or its alloy in the form of film is deposited on a surface protective layer of the lithium manganese-metal complex oxide provided on the collector. The surface protective layer is made of electroconductive material. Thus arranged electrode material is then subjected to self discharging reaction in the presence of an electrolytic solution.

The processes 2) and 3) are preferred. Most preferred is the process 3), because the electroconductive protective layer can relieve progress of quick exothermic reaction.

(2) Use of lithium metal or alloy arranged on negative electrode side.

This process can be performed by one of the following processes.

1) The lithium metal or its alloy is deposited on an electric collector of negative electrode having the negative electrode active material precursor thereon, preferably, to give an electric contact between the lithium metal or alloy and the precursor. Thus arranged electrode material is then subjected to discharging reaction in the presence of an electrolytic solution utilizing an externally set electric circuit to produce a lithium ion from the lithium metal or alloy and intercalate it into the lithium manganese-metal complex oxide on the positive electrode side.

2) The lithium metal or its alloy in the form of film is deposited directly on the surface of the negative electrode active material precursor provided on the collector. Thus arranged electrode material is then subjected to discharging reaction in the presence of an electrolytic solution utilizing an externally set electric circuit to produce a lithium ion from the lithium metal or alloy and intercalate it into the lithium manganese-metal complex oxide on the positive electrode side.

3) The lithium metal or its alloy in the form of film is deposited on a surface protective layer of the negative electrode active material precursor provided on the collector. The surface protective layer is made of electroconductive material. Thus arranged electrode material is then subjected to discharging reaction in the presence of an electrolytic solution utilizing an externally set electric circuit to produce a lithium ion from the lithium metal or alloy and intercalate them into the lithium manganese-metal complex oxide on the positive electrode side.

The processes 2) and 3) are preferred. Most preferred is the process 3), because the electroconductive protective layer can relieve progress of quick exothermic reaction.

In the positive electrode active material precursor of $Li_{1+x}Mn_{2-a}M_{a/c}O_{4+b}$ of the invention, x preferably is under the condition of $0.3<x<1$. More preferably is $0.5<x\leq 0.9$, if the lithium ion secondary battery of the invention is to give a higher charge capacity per volume than $LiCoO_2$ which is known as a positive electrode active material to have a high charge capacity.

The positive electrode active material precursor is preferably converted into a positive electrode active material of the formula of $Li_yMn_{2-a}M_{a/c}O_{4+b}$ under the condition of $0<y<0.3$, more preferably $0<y<0.2$ for increasing the discharge capacity.

In the lithium ion secondary battery of the invention, the lithium manganese-metal complex oxide in the positive electrode active material preferably keeps the formula of $Li_yMn_{2-a}M_{a/c}O_{4+b}$ under the condition of $0<y<1$, more preferably $0<y<0.9$, in the repeated charge-discharge cycles so that the desired high electric potential can be maintained. The value of "y" is kept under "1".

The lithium metal or lithium alloy employed for the preparation of the positive electrode active material preferably has a high lithium content such as a lithium content of higher than 95%. The lithium metal preferably is in the form of a thin film (or foil) having uniform thickness. The thickness preferably is in the range of 10 to 100 μm. Examples of the lithium alloy include Li—Al, Li—Al—Mn, Li—Al—Mg, Li—Al—Sn, Li—Al—In, and Li—Al—Cd. The lithium or its alloy is preferably deposited on the lithium manganese-metal complex oxide (precursor for the preparation of the positive electrode active material precursor) or the negative electrode active material precursor directly or via an electroconductive protective layer in a dry gas atmosphere.

The lithium manganese-metal complex oxide can be employed further in combination with a lithium-containing transition metal oxide which serves as sub-active material. An preferred example of the sub-active material is lithium cobalt oxide ($Li_xCoO_2$, $0.5 \leq x \leq 1$, which gives a high voltage and a high electric capacity). Also preferred is lithium cobalt-nickel oxide ($Li_xCo_yNi_zO_2$, $0.5<x\leq 1$, $0\leq y\leq 1$, $0<z\leq 1$, provided that y+z is not 0). The sub-active material may be a solid solution made of cobalt, other transition metal elements, non-transition metal elements, an alkali metal, and/or lanthanides.

The sub-active material can be employed in combination with the lithium manganese-metal complex oxide in the weight ratio of 2/8 to 1/9 (former/latter), preferably 3/7 to 7/3.

In the above-described process, the positive electrode active material precursor of the invention can be produced in the container of a battery.

Hereinbelow are described a process for a nonaqueous lithium ion secondary battery precursor and a process for a lithium ion secondary battery.

The lithium ion secondary battery precursor of the invention preferably comprises a positive electrode active material precursor, a negative electrode active material precursor containing essentially no Li (namely, containing no movable lithium), and a non-aqueous organic electrolyte solution in a container of battery.

The above-mentioned battery precursor is electrically charged to convert the positive electrode active material precursor of the formula: $Li_{1+x}Mn_{2-a}M_{a/c}O_{4+b}$ [wherein M is cation of a metal other than Li and Mn; x, a and b are numbers satisfying the conditions of $0.3<x<1.2$, $0<a\leq 1.0$, and $0\leq b<0.4$, respectively; and c is a number of 1 to 4] into the positive electrode active material of the formula: $Li_yMn_{2-a}M_{a/c}O_{4+b}$ [wherein M, a, b and c are the same as above, and y is a number satisfying the condition of $0<y\leq 1.0$] and simultaneously convert the negative electrode active material precursor into a negative electrode active material having a lithium ion inserted therein.

The electric charge (i.e., preliminary charge) to convert the positive electrode active material precursor and the negative electrode active material precursor into the positive electrode active material and the negative electrode active material, respectively, is described below.

The positive electrode active material precursor is activated and converted into the positive electrode active material in the battery container by an electric charging process.

The term of "activate" is used to mean to impart to the positive electrode active material an electrochemically less noble (or base) potential so that the activated positive electrode active material has a crystalline structure in which a reversible charge-discharge cycle can proceed (namely, release and intercalation of Li can be done) keeping the active material at a high discharge potential. In the invention, the high discharge potential means 3.8 V or more, preferably 4.2 V or more, for Li. For instance, Li is released from the active material in an amount of 0.9 equivalent or more at an electric potential of 4.2 V or higher, and 0.95 equivalent or more at an electric potential of 4.3 V or more.

The positive electrode active material precursor and the activated material (i.e., positive electrode active material) both essentially have a spinel crystal structure. Nevertheless, the precursor and the active material are different from each other in the chemical composition and the three-dimensional configuration of crystal lattice. In more detail, the precursor is a crystal of tetragonal system having an elemental composition of $Li_{1+x}Mn_2O_4$ ($0.3<x<1.2$), while the active material is a crystal of cubic system having an elemental composition of $Li_yMn_2O_4$ ($0<y\leq1.0$). Therefore, the potential level concerning release and intercalation of lithium ion is greatly different between both material. The potential level of the precursor to Li is approximately 3 V, while the potential level of the active material to Li is approximately 4 V. Accordingly, the difference of potential level is nearly 1 V.

In the positive electrode active material (i.e., activated material) of the invention, the "y" of the formula does not exceed 1. Preferably, "y" is a number satisfying the condition of $0<y\leq0.9$.

The active material obtained as a result of electrochemical release of Li ion from the precursor preferably has a composition of $Li_yMn_{2-a}M_{a/c}O_{4+b}$ [wherein M, a, b and c are the same as above, and y is a number satisfying the condition of $0<y<0.3$, more preferably $0<y<0.2$] so that a positive electrode active material has a high discharge capacity. Preferably, "y" of the formula of the finally obtained active material satisfies the condition of $0.03<y<0.2$.

In the course of the above-mentioned charging process (i.e., preliminary charging), the battery precursor containing the positive electrode active material precursor and having a low voltage (open electromotive voltage of 1 V or lower) is activated to give the positive electrode active material having the formula $Li_yMn_{2-a}M_{a/c}O_{4+b}$ and a higher electric potential. Thus produced battery is a secondary battery of a high voltage type.

In the following Table 1, the preferred compositions of the positive electrode active materials and the corresponding precursors are set forth in terms of their chemical compositions. These compositions should not be construed to restrict the present invention.

TABLE 1

| No. | Composition of Precursor | Variation of Composition of Active Material |
|---|---|---|
| 1 | $Li_{1.8}Mn_{1.9}Co_{0.1}O_4$ | $Li_{0.1-0.9}Mn_{1.9}Co_{0.1}O_4$ |
| 2 | $Li_{1.8}Mn_{1.8}Co_{0.2}O_{4.1}$ | $Li_{0.1-0.9}Mn_{1.8}Co_{0.2}O_{4.1}$ |
| 3 | $Li_{1.9}Mn_{1.9}Co_{0.03}O_{4.1}$ | $Li_{0.1-0.9}Mn_{1.9}Co_{0.03}O_{4.1}$ |

TABLE 1-continued

| No. | Composition of Precursor | Variation of Composition of Active Material |
|---|---|---|
| 4 | $Li_{1.8}Mn_{1.8}Co_{0.07}O_4$ | $Li_{0.1-0.9}Mn_{1.8}Co_{0.07}O_4$ |
| 5 | $Li_{1.8}Mn_{1.8}Co_{0.2}O_{4.3}$ | $Li_{0.1-0.9}Mn_{1.8}Co_{0.07}O_4$ |
| 6 | $Li_{1.8}Mn_{1.9}Fe_{0.1}O_4$ | $Li_{0.1-0.9}Mn_{1.9}Fe_{0.1}O_4$ |
| 7 | $Li_{1.8}Mn_{1.9}Fe_{0.05}O_{4.2}$ | $Li_{0.1-0.9}Mn_{1.9}Fe_{0.05}O_4$ |
| 8 | $Li_{1.8}Mn_{1.9}Fe_{0.05}O_{4.2}$ | $Li_{0.1-0.9}Mn_{1.9}Fe_{0.05}O_{4.2}$ |
| 9 | $Li_{1.8}Mn_{1.9}Cr_{0.05}O_{4.2}$ | $Li_{0.1-0.9}Mn_{1.9}Cr_{0.05}O_{4.2}$ |
| 10 | $Li_{1.8}Mn_{1.95}Cu_{0.05}O_4$ | $Li_{0.1-0.9}Mn_{1.95}Cu_{0.05}O_4$ |
| 11 | $Li_{1.9}Mn_{1.9}Cu_{0.05}O_4$ | $Li_{0.2-0.9}Mn_{1.9}Cu_{0.05}O_4$ |
| 12 | $Li_{1.9}Mn_{1.9}Cu_{0.05}O_{4.1}$ | $Li_{0.2-0.9}Mn_{1.9}Cu_{0.05}O_{4.1}$ |
| 13 | $Li_{1.9}Mn_{1.9}Cu_{0.1}O_4$ | $Li_{0.2-0.9}Mn_{1.9}Cu_{0.1}O_4$ |
| 14 | $Li_{1.9}Mn_{1.85}Ni_{0.05}O_{4.2}$ | $Li_{0.2-0.9}Mn_{1.85}Ni_{0.05}O_{4.2}$ |
| 15 | $Li_{1.9}Mn_{1.85}Ni_{0.07}O_4$ | $Li_{0.2-1.85}Mn_{1.85}Ni_{0.07}O_4$ |
| 16 | $Li_{1.9}Mn_{1.85}Ni_{0.15}O_{4.1}$ | $Li_{0.2-0.9}Mn_{1.85}Ni_{0.15}O_{4.1}$ |
| 17 | $Li_{1.9}Mn_{1.95}Ti_{0.05}O_4$ | $Li_{0.2-0.9}Mn_{1.95}Ti_{0.05}O_4$ |
| 18 | $Li_{1.9}Mn_{1.95}Ti_{0.05}O_{4.2}$ | $Li_{0.2-0.9}Mn_{1.95}Ti_{0.05}O_{4.2}$ |
| 19 | $Li_{1.9}Mn_{1.95}Ti_{0.02}O_4$ | $Li_{0.2-0.9}Mn_{1.95}Ti_{0.02}O_4$ |
| 20 | $Li_{1.9}Mn_{1.95}Ti_{0.02}O_{4.2}$ | $Li_{0.2-0.9}Mn_{1.95}Ti_{0.02}O_{4.2}$ |
| 21 | $Li_{1.9}Mn_{1.95}Zr_{0.02}O_4$ | $Li_{0.2-0.9}Mn_{1.95}Zr_{0.05}O_4$ |
| 22 | $Li_{1.9}Mn_{1.95}Zr_{0.02}O_4$ | $Li_{0.2-0.9}Mn_{1.95}Zr_{0.02}O_4$ |
| 23 | $Li_{1.9}Mn_{1.95}Zr_{0.02}O_{4.2}$ | $Li_{0.2-0.9}Mn_{1.95}Zr_{0.02}O_{4.2}$ |
| 24 | $Li_{1.9}Mn_{1.95}Nb_{0.05}O_4$ | $Li_{0.2-0.9}Mn_{1.95}Nb_{0.05}O_4$ |
| 25 | $Li_{1.9}Mn_{1.95}Nb_{0.02}O_4$ | $Li_{0.2-0.9}Mn_{1.95}Nb_{0.02}O_4$ |
| 26 | $Li_{1.9}Mn_{1.95}Nb_{0.02}O_{4.2}$ | $Li_{0.2-0.9}Mn_{1.95}Nb_{0.02}O_{4.2}$ |
| 27 | $Li_{1.9}Mn_{1.95}Y_{0.05}O_4$ | $Li_{0.2-0.9}Mn_{1.95}Y_{0.05}O_4$ |
| 28 | $Li_{1.9}Mn_{1.95}Y_{0.02}O_4$ | $Li_{0.2-0.9}Mn_{1.95}Y_{0.02}O_4$ |
| 29 | $Li_{1.9}Mn_{1.95}Y_{0.02}O_{4.2}$ | $Li_{0.2-0.9}Mn_{1.95}Y_{0.02}O_{4.2}$ |
| 30 | $Li_{1.9}Mn_{1.95}Al_{0.05}O_4$ | $Li_{0.2-0.9}Mn_{1.95}Al_{0.05}O_4$ |
| 31 | $Li_{1.9}Mn_{1.95}Al_{0.02}O_4$ | $Li_{0.2-0.9}Mn_{1.95}Al_{0.02}O_4$ |
| 32 | $Li_{1.9}Mn_{1.95}Al_{0.02}O_{4.3}$ | $Li_{0.2-0.9}Mn_{1.95}Al_{0.02}O_{4.3}$ |
| 33 | $Li_{2.0}Mn_{1.97}Na_{0.03}O_4$ | $Li_{0.2-1.0}Mn_{1.97}Na_{0.03}O_4$ |
| 34 | $Li_{2.0}Mn_{1.97}K_{0.03}O_4$ | $Li_{0.2-1.0}Mn_{1.97}K_{0.03}O_4$ |
| 35 | $Li_{2.0}Mn_{1.97}Mg_{0.03}O_4$ | $Li_{0.2-1.0}Mn_{1.97}Mg_{0.03}O_4$ |
| 36 | $Li_{2.0}Mn_{1.97}Ca_{0.03}O_4$ | $Li_{0.2-1.0}Mn_{1.97}Ca_{0.03}O_4$ |
| 37 | $Li_{2.0}Mn_{1.97}Cs_{0.03}O_4$ | $Li_{0.2-1.0}Mn_{1.97}Cs_{0.03}O_4$ |
| 38 | $Li_{2.0}Mn_{1.92}La_{0.04}O_4$ | $Li_{0.2-1.0}Mn_{1.92}La_{0.04}O_4$ |
| 39 | $Li_{2.0}Mn_{1.92}Ce_{0.08}O_4$ | $Li_{0.2-1.0}Mn_{1.92}Ce_{0.08}O_4$ |
| 40 | $Li_{2.0}Mn_{1.92}Nd_{0.04}O_4$ | $Li_{0.2-1.0}Mn_{1.92}Nd_{0.04}O_4$ |
| 41 | $Li_{2.0}Mn_{1.92}Sm_{0.04}O_4$ | $Li_{0.2-1.0}Mn_{1.92}Sm_{0.04}O_4$ |
| 42 | $Li_{2.0}Mn_{1.92}Eu_{0.04}O_4$ | $Li_{0.2-1.0}Mn_{1.92}Eu_{0.04}O_4$ |

The negative electrode active material (i.e., anode active material) preferably employed in the lithium ion secondary battery of the invention is a lithium-containing metal oxide of a low electric potential which is produced in the container of the final battery product by intercalating a lithium ion into a metal oxide containing essentially no lithium ion in the container. The term of "metal oxide containing essentially no lithium ion" means "metal oxide containing essentially no movable lithium ion". Such negative electrode active material can give a lithium ion secondary battery of a high battery capacity when it is employed in combination with the positive electrode active material of the invention.

The negative electrode active material is, as described above, produced by intercalating a lithium ion into a negative electrode active material precursor of a metal oxide in the container of the final battery product. The metal oxide preferably contains a tin atom and one or more other atoms. Preferred are metal oxides having one of the following two formulas:

$$SnL_kO_z \quad (1)$$

In the formula, L represents at least one atom selected from the group consisting of Al, B, P, Si, elements of Groups 1 to 3 of Periodic Table (such as Li, Na, K, Rb, Cs, Be, Mg, Ca, Sr, Ba, Sc, Y, and lanthanides) and halogen atoms. k and z are numbers satisfying the conditions of $0.2\leq k\leq 2$ and $1\leq z\leq 6$, respectively.

Among the tin-containing metal oxides of the formula (1), a compound of $SnT_hR_iO_z$ (in which T is at least one atom selected from the group consisting of Al, B, P, element of Groups 1 to 3 of Periodic Table, and halogens, and h, i and z are numbers satisfying the conditions of $0.2 \leq h \leq 2$, $0.01 \leq i \leq 1$, $0.2 \leq h+i \leq 2$, and $1 \leq z \leq 6$, respectively) is particularly preferred.

$$Sn_d Q_{1-d} L_k O_z \qquad (2)$$

In the formula, Q is a transition metal atom, L is at least one atom selected from the group consisting of Al, B, P, Si, elements of Groups 1 to 3 of Periodic Table (such as Li, Na, K, Rb, Cs, Be, Mg, Ca, Sr, Ba, Sc, Y, and lanthanides), and halogens, and d, k and z are numbers satisfying the conditions of $0.1 \leq d \leq 0.9$, $0.2 \leq k \leq 2$, and $1 \leq z \leq 6$, respectively.

$$Sn T_n R_i O_z \qquad (3)$$

In the formula, T is an atom selected from the group consisting of Al, B, and P, R is at least one atom selected from the group consisting of elements of Groups 1 to 3 of Periodic Table (such as Li, Na, K, Rb, Cs, Be, Mg, Ca, Sr, Ba, Sc, Y, and lanthanides), and halogens, and h, i, and z are numbers satisfying the conditions of $0.2 \leq h \leq 2$, $0.01 \leq i \leq 1$, $0.2 \leq h+i \leq 2$, and $1 \leq z \leq 6$, respectively.

The metal oxide for the preparation of the negative electrode active material preferably is amorphous material when it is placed in the container of the final battery product. The term of "amorphous material", in the invention means a material which gives a broad scattered band having its main peak in the range of 20° to 40° (in terms of 2θ) in X-ray diffraction using Cu-K α rays. In the scattered band, a diffraction line may be present. The diffraction line in the range of 40° to 70° (in term of 2θ) preferably has a strength as much as 500 times or less (more preferably as much as 100 times or less, and moreover as much as 5 times or less) than the diffraction line in the range of 20° to 40° (in term of 2θ). Most preferably, there appears no diffraction lines representing a crystalline structure.

Examples of the tin-containing metal oxides for the negative electrode active material precursor include the following compounds: $SnSi_{0.8}P_{0.2}O_{3.1}$, $SnSi_{0.5}Al_{0.1}B_{0.2}P_{0.2}O_{1.95}$ $SnSi_{0.8}B_{0.2}O_{2.9}$, $SnSi_{0.8}Al_{0.2}O_{2.9}$, $SnSi_{0.6}Al_{0.1}B_{0.2}O_{1.65}$, $SnSi_{0.3}Al_{0.1}P_{0.6}O_{2.25}$, $SnSi_{0.4B}B_{0.2}P_{0.4}O_{2.1}$, $SnSi_{0.6}Al_{0.1}B_{0.5}O_{2.1}$, $SnB_{0.5}P_{0.5}O_3$, $SnAl_{0.3}B_{0.5}P_{0.2}O_{2.7}$, $SnK_{0.2}PO_{3.6}$, $SnRb_{0.2}Al_{0.05}P_{0.8}O_{3.25}$, $SnAl_{0.3}B_{0.7}O_{2.5}$, $SnBa_{0.1}Al_{0.15}P_{1.45}O_{4.7}$, $SnLa_{0.1}Al_{0.1}P_{0.9}O_{3.55}$, $SnNa_{0.1}Al_{0.05}B_{0.45}O_{1.8}$, $SnLi_{0.2}B_{0.5}P_{0.5}O_{3.1}$, $SnCs_{0.1}B_{0.4}P_{0.4}O_{2.65}$, $SnBa_{0.1}B_{0.4}P_{0.4}O_{2.7}$, $SnCa_{0.1}Al_{0.15}B_{0.45}P_{0.55}O_{3.9}$, $SnY_{0.1}Al_{0.3}B_{0.6}P_{0.6}O_4$, $SnRb_{0.2}Al_{0.1}B_{0.3}P_{0.4}O_{2.7}$, $SnCs_{0.2}Al_{0.1}B_{0.3}P_{0.4}O_{2.7}$, $SnCs_{0.1}Al_{0.1}B_{0.4}P_{0.4}O_{2.8}$, $SnK_{0.1}Cs_{0.1}B_{0.4}P_{0.4}O_{2.7}$, $SnBa_{0.1}Cs_{0.1}B_{0.4}P_{0.4}O_{2.75}$, $SnMg_{0.1}K_{0.1}B_{0.4}P_{0.4}O_{2.75}$, $SnCa_{0.1}K_{0.1}B_{0.4}P_{0.5}O_3$, $SnBa_{0.1}K_{0.1}Al_{0.1}B_{0.3}P_{0.4}O_{2.75}$, $SnMg_{0.1}Cs_{0.1}Al_{0.1}B_{0.3}P_{0.4}O_{2.75}$, $SnCa_{0.1}K_{0.1}Al_{0.1}B_{0.3}P_{0.4}O_{2.75}$, $SnMg_{0.1}Rb_{0.1}Al_{0.1}B_{0.3}P_{0.4}O_{2.75}$, $SnCa_{0.1}B_{0.2}P_{0.2}F_{0.2}O_{2.6}$, $SnMg_{0.1}Cs_{0.1}B_{0.4}P_{0.4}F_{0.2}O_{3.3}$, $SnMg_{0.1}Al_{0.2}B_{0.4}P_{0.4}F_{0.2}O_{2.9}$, $Sn_{0.5}Mn_{0.5}Mg_{0.1}B_{0.9}O_{2.45}$, $Sn_{0.5}Mn_{0.5}Ca_{0.1}P_{0.9}O_{3.35}$, $Sn_{0.5}Ge_{0.5}Mg_{0.1}P_{0.9}O_{3.35}$, $Sn_{0.5}Fe_{0.5}Ba_{0.1}P_{0.9}O_{3.35}$, $Sn_{0.5}Fe_{0.5}Al_{0.1}B_{0.9}O_{2.5}$, $Sn_{0.8}Fe_{0.2}Ca_{0.1}P_{0.9}O_{3.35}$, $Sn_{0.3}Fe_{0.7}Ba_{0.1}P_{0.9}O_{3.35}$, $Sn_{0.9}Mn_{0.1}Mg_{0.1}P_{0.9}O_{3.35}$, $Sn_{0.2}Mn_{0.8}Mg_{0.1}P_{0.9}O_{3.35}$, $Sn_{0.7}Pb_{0.3}Ca_{0.1}P_{0.9}O_{3.35}$, $Sn_{0.2}Ge_{0.8}Ba_{0.1}P_{0.9}O_{3.35}$, $Sn_{1.0}Al_{0.1}B_{0.5}O_{3.15}$, $Sn_{1.0}Cs_{0.1}B_{0.5}P_{0.5}O_{3.05}$, $Sn_{1.0}Cs_{0.1}Al_{0.1}B_{0.5}P_{0.5}O_{3.20}$, $Sn_{1.0}Cs_{0.1}Al_{0.3}B_{0.5}P_{0.5}O_{3.50}$, $Sn_{1.0}Cs_{0.1}Ge_{0.05}Al_{0.1}B_{0.5}P_{0.5}O_{3.20}$, and $Sn_{1.0}Cs_{0.1}Ge_{0.05}Al_{0.3}B_{0.5}P_{0.5}O_{3.60}$.

The negative electrode active material of the lithium ion secondary battery of the invention is produced by intercalating a lithium ion electrochemically into the negative electrode active material precursor such as those described above. The intercalation is performed by electrically charging the battery precursor which comprises a positive electrode active material precursor, a negative electrode active material precursor, and a non-aqueous electrolyte containing a lithium ion. The negative electrode active material preferably shows a ratio of the amount of lithium ions to be released from the negative electrode active material until the discharge voltage of the battery lowers to 3 V in a discharge step, to the amount of lithium ion intercalated into the negative electrode active material precursor is lower than $1/(1+x)$ wherein x is of the formula of $Li_{1+x}Mn_{2-a}M_{a/c}O_{4+b}$.

There is no specific limitation on the amount of a lithium ion to be intercalated into the negative electrode active material. For example, the lithium ion is preferably intercalated into the material so as to show 0.05 volt, more preferably 0.1 volt, most preferably 0.15 V, against Li—Al alloy (80–20 wt. %). In these cases, the amount of the intercalated lithium ion becomes to correspond to 3 to 10 equivalent amounts depending on the electric potential. The electric capacity resulting from the intercalation generally reaches a high value such as about 500 mAh/g. In consideration of the desired electric capacity on the negative electrode active material, the amounts of the lithium manganese-metal complex oxide (material for preparing the positive electrode active material precursor) and a lithium metal (or lithium alloy) to be placed on the positive electrode side are determined. For instance, the total equivalents of lithium ion releasable from the lithium manganese-metal complex oxide and the lithium metal (or lithium alloy) preferably is in the range of 0.5 to 2 as much as the equivalent of lithium ion to be intercalated into the negative electrode active material precursor.

The positive electrode active material (and its precursor, and the lithium manganese-metal complex oxide for the preparation of the precursor) and the negative electrode active material (and its precursor) preferably are in the form of particles having a mean diameter of 0.03 to 50 μm, more preferably 0.1 to 20 μm. The mean diameter corresponds to a mode diameter representing the maximum frequency point which is determined, for instance, by preparing an average value of values determined by microscopic observation or by measurement utilizing an apparatus for measuring particle size distribution. The active materials preferably have a specific surface area of 0.1 to 50 m²/g. The positive electrode active material and its precursor preferably has a specific surface area of 1 to 10 m²/g.

In the preparation of the lithium ion secondary batter of the invention, other negative electrode active materials can be employed in combination with the metal oxide. Examples of such other active materials include lithium metal, lithium alloys, and carbonaceous material which can absorb and desorb lithium ion or lithium metal. The lithium metal and its alloys described herein are not employed as the negative electrode active material but only for releasing a lithium ion to give the positive electrode active material precursor in the container, as described hereinbefore.

The lithium ion secondary battery of the invention can be manufactured in the conventional way using the materials described above. In manufacturing the secondary battery, other materials and elements can be further incorporated together with the electrode materials and the electrolytic solution.

The lithium ion secondary battery of the invention can be manufactured to give secondary batteries in various types such as cylinder, coin, button, sheet, and square.

FIGURE in the attached drawing, a lithium ion secondary battery 1 of a representative cylinder type is illustrated, in which 6 denotes a container of battery (i.e., battery can which also serves as a terminal of negative electrode); 2 and 3 denote a positive electrode sheet and a negative electrode sheet, respectively; 4 denotes a separator for separating the positive electrode sheet 2 and the negative electrode sheet 3; 5 denotes an electrolytic solution, 7 denotes a gasket, 8 denotes a cap (i.e., battery cap which also serves as a terminal of positive electrode), and 9 denotes a safety valve. The positive electrode sheet 2 and the negative electrode sheet 3 are combined via the separator 4 and wound together spirally.

Each of the positive electrode sheet and the negative electrode sheet can be prepared by coating a mixture of the materials for the preparation of the electrode active material precursor such as the lithium manganesemetal complex oxide, electroconductive material, binder, and filler on a collector. The mixture is generally called "electrode mixture". The mixture is coated on the collector in the form of a solution and then dried.

Examples of the electroconductive materials are electroconductive materials which are chemically stable in the battery and include naturally produced graphites such as flake graphite, massive graphite, synthetic graphite, carbon black, acetylene black, ketchen black, carbonaceous fibers, powder of metal (e.g., copper, nickel, aluminum, or silver), metal fibers, and polyphenylene derivatives. These materials can be employed singly or in combination. Particularly preferred is a combination of graphite and acetylene black. The amount of the electro-conductive material incorporated into the electrode material is generally not more than 50 wt. %, preferably 1 to 50 wt. %, more preferably 2 to 30 wt. %. When carbon or graphite is employed, its amount preferably is in the range of 2 to 15 wt. %.

Examples of the binders include polysaccharides, thermoplastic resins, and elastic polymers, such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyfluorinated vinylidene, polyethylene, polypropylene, ethylene-propoylene-diene terpolymer (EPDM), sulfonated EPDM, styrene-butadiene rubber, polybutadiene, fluorinated rubber, and polyethylene oxide. These materials can be employed singly or in combination. The amount of the binder preferably is in the range of 2 to 30 wt. %.

Examples of the fillers are any fibrous materials which are chemically stable in the battery and include fibers of olefin polymers such as polypropylene and polyethylene, glass material and carbonaceous materials. The filler can be included in an amount of not more than 30 wt. %.

The electrode mixtures for the positive and negative electrodes can further contain an electrolytic solution and/or a supporting salt. For instance, an ion conductive polymer, nitromethane, and/or an electrolytic solution can be incorporated.

The collector comprises an electro-conductive material which is chemically stable in the battery. Examples of the collectors for positive electrode include sheets of stainless steel, nickel, aluminum, titanium, fired carbon, and sheet of aluminum or stainless steel which is plated with carbon, nickel, titanium or silver. Examples of the collectors for negative electrode include sheets of stainless steel, nickel, copper, titanium, aluminum, fired carbon, sheet of copper or stainless steel which is plated with carbon, nickel, titanium or silver, and Al—Cd alloy. The collectors can be oxidized on their surfaces. The collectors can be made in various forms such as sheet, foil, film, net, punched sheet, porous body and sheet, and combined fibers (fibrous mass). The thickness of the collector generally is in the range of 5 to 100 μm.

The electrolyte solution comprises a non-protonic organic solvent and a lithium salt (namely, electrolyte) soluble in the solvent. Examples of the organic solvents include propylene carbonate, ethylene carbonate, butylene carbonate, dimethyl carbonate, diethyl carbonate, γ-butylolactone, 1,2-dimethoxyethane, tetrahydrofuran, 2-methyltetrahydrofuran, dimethyl sulfoxide, 1,3-dioxolane, formamide, dimethyl formamide, dioxolane, acetonitrile, nitromethane, methyl formate, methyl acetate, phosphoric triester, trimethoxymethane, dioxolane derivatives, sulforane, 3-methyl-2-oxazolidinone, propylene carbonate derivatives, tetrahydrofuran derivatives, diethyl ether, and 1,3-propane sultone. These solvents can be employed singly or in combination. Examples of the lithium salts include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium, and lithium tetraphenylborate. These lithium salts can be employed singly or in combination.

Preferred is an electrolytic solution of $LiCF_3SO_3$, $LiClO_4$, $LiBF_4$ and/or $LiPF_6$ in a mixture of propylene carbonate or ethylene carbonate with 1,2-dimethoxyethane and/or diethyl carbonate. In the mixture, propylene carbonate or ethylene carbonate is mixed with 1,2-dimethoxyethane and/or diethyl carbonate preferably in the ratio of 0.4/0.6 to 0.6/0.4. 1,2-dimethoxyethane and diethyl carbonate are preferably mixed in a ratio of 0.4/0.6 to 0.6/0.4. The concentration of the electrolyte preferably is in the range of 0.2 to 3 moles per one liter of the electrolytic solution.

The electrolytic solution can contain one or more organic solid electrolytes. Examples of the employable organic solid electrolyte include polyethylene oxide derivatives, polymers having polyethylene oxide unit, polypropylene oxide derivatives, polymers having polypropylene oxide unit, polymers having ion releasable group, a mixture of a polymer having ion releasable group and the aforementioned non-protonic electrolyte, and phosphoric ester polymers. The electrolytic solution may contain polyacrylonitrile. Also known is a combination of inorganic and organic solid electrolytes, as described in Japanese Patent Provisional Publication No. 60(1985)-1768.

The electrolytic solution can further contain one or more materials mentioned below, for improving charge-discharge characteristics: pyridine, triethyl phosphite, triethanolamine, cyclic ethers, ethylene diamine, n-glyme, triamide hexaphosphate, nitrobenzene derivatives, sulfur, quinoneimine dyes, N-substituted oxazolidinone, N,N'-substituted imidazolidinone, ethylene glycol dialkyl ether, quaternary ammonium salts, polyethylene glycol, pyrrole, 2-methoxyethanol, aluminum trichloride, electroconductive polymer, monomers of electrolyte active materials, triethylene phosphoneamide, trialkylphosphine, morpholine, aryl compounds having carbonyl group, hexamethylphosphoric triamide, 4-alkylmorpholine, bicyclic tertiary amines, oils, quaternary phosphonium salts, and tertiary sulfonium salts. A halogen-containing solvents such as carbon tetrachloride or trifluorinated chlorinated ethylene can be incorporated into the electrolytic solution so as to render the battery incombustible. Carbon dioxide gas may be incorporated into the electrolytic solution to improve the battery in its resistance in high temperature storage.

The separator is an electro-insulating thin film having a high ionic permeation rate and an appropriate physical strength. For instance, a sheet or non-woven sheet made of an olefinic polymer such as polypropylene and polyethylene, or glass fiber can be employed. The pore sizes of the separator generally is in the range of 0.01 to 10 μm. The thickness of the separator generally is in the range of 5 to 300 μm. If a solid electrolytic material such as polymer is employed as the electrolyte, the electrolyte can serve as the separator.

The surface of the positive electrode active material can be modified. For instance, the surface of the lithium manganese oxide is treated with an esterifying agent or a chelating agent or coated with an electroconductive polymer or polyethylene oxide. The surface of the negative electrode active material can be also modified, for instance, by coating its surface with an ion conductive polymer or a polyacetylene layer or treated with a lithium salt.

The electrode mixture can be processed to give pellets. In the manufacture of the secondary battery of cylinder, coin or square, the electrode mixture is coated on the collector, dehydrated, dried, and pressed to give a sheet. The pressed dry sheet preferably has a thickness of 10 to 500 μm.

The lithium ion secondary battery (i.e., non-aqueous lithium ion secondary battery) of the invention can be utilized in various products and devices. Examples are handy personal computers (color or monochromatic), personal computers for imputing with pen, palm-top personal computers, note-type word processors, handy word processors, players for electronically playable book, handy phones, cordless phones (separated phones), pagers, handy terminals, handy facsimiles, handy copying machines, handy printers, head-phone stereos, video movies, liquid crystal television sets, handy cleaners, potable CD players, mini-disk players, electric shavers, electronic interpreters, phones for automobiles, transceivers, electrically actuatable tools, electronic pocket notes, electronic calculators, memory cards, tape recorders, radio sets, and back-up electric sources. The secondary battery is also employable for motor cars, electric cars, motors, illuminating devices, toys, machines for amusement game, road conditioners, iron devices, watches, strobes, cameras, medical equipments (pace makers, hearing aids, massaging devices). The secondary battery is further employable in the fields of space technology and military area. The secondary battery can be employed in combination with other electric sources such as solar battery.

The present invention is further described in the following non-limitative examples.

Synthesis of Negative Electrode Active Material Precursor (1) $SnB_{0.5}P_{0.5}O_3$ (Compound A-1)

SnO (67.4 g), $B_2O_3$ (17.4 g), and $Sn_2P_2O_7$ (102.8 g) were mixed and pulverized in an automatic mortar. The pulverized mixture was placed in an alumina crucible and fired at 1,000° C. for 10 hours under argon gas atmosphere. After the firing was complete, the mixture was cooled rapidly at a rate of 100° C./min., to give the negative electrode active material of $SnB_{0.5}P_{0.5}O_3$ as transparent yellowish glass. The X-ray diffraction measurement indicated that no diffraction lines to be assigned to any crystal structures were observed, and that the obtained oxide was amorphous.

(2) In the same manner as above, the following negative electrode active material precursors were obtained.

$Sn_{1.5}K_{0.2}PO_{3.5}$ (Compound A-2)

$SnAl_{0.1}B_{0.5}P_{0.5}Mg_{0.1}F_{0.2}O_{3.15}$ (Compound A-3)

The obtained negative electrode active material precursors showed an irreversible capacity of 300 mAH per one gram of the active material in the course of activation to give an active material.

Preparation of Lithium Manganese Oxide for Preparing Positive Electrode Active Material Precursor (1) $Li_{1.02}Mn_{1.95}Co_{0.02}O_{4.2}$ of spinel crystal structure (Compound C-1)

Electrolytically synthesized manganese dioxide (EMD, particle size: 5 to 50 μm, BET specific surface area: 40–70 m²/g, containing less than 1 wt. % of $Mn_2O_3$ and $Mn_3O_4$, and less than 3 wt. % of sulfates and water), cobalt carbonate and lithium carbonate (which were beforehand pulverized to give a mean particle size of 1–10 μm) were mixed in a stoichiometric amount. The mixture was heated to 600° C. for 4 hours, and the heated mixture was fired at 750° C. for 24 hours under atmospheric conditions. Thus fired product was slowly cooled to room temperature at a rate of 2° C./min. The cooled product was again pulverized in an automatic mortar to give a powdery product having a primary particle size of 0.5 μm and a secondary particle size of 8 to 20 μm (median size: 12.5 μm). BET specific surface area was 2 to 4 m²/g, which depended upon the pulverizing conditions.

The crystal structure and composition of the resulting product was identified using ICP and X-ray diffraction measurement, which indicated that the fired product was $Li_{1.02}Mn_{1.95}Co_{0.02}O_{4.2}$ having a spinel crystal structure. The X-ray diffraction measurement indicated that the half width of the diffraction peak at 2θ=36° (Cu α-rays) was approximately 0.3, and its strength was 27% of the peak at 2θ=18.6°. The lattice constant of "a" axis of the crystal was 8.22 A. Further, it was revealed that the fired product contained a small amount of $LiMnO_2$. Five grams of the fired product was dispersed in 100 mL of pure water and pH value of the dispersion was measured to give pH 8.0.

(2) $LiMn_2O_4$ (Compound C-0 for reference)

The above-mentioned procedures were repeated except that cobalt carbonate was not employed, and the lithium hydroxide and EMD were employed at a ratio of 1:2 to give $LiMn_2O_4$ (Compound C-0).

(3) $Li_{1.02}Mn_{1.95}Fe_{0.02}O_{4.2}$ (Compound C-2)
$Li_{1.02}Mn_{1.95}Cr_{0.02}O_{4.2}$ (Compound C-3)
$Li_{1.02}Mn_{1.95}Cu_{0.02}O_{4.2}$ (Compound C-4)
$Li_{1.02}Mn_{1.95}Al_{0.02}O_{4.2}$ (Compound C-5)
$Li_{1.02}Mn_{1.95}Mg_{0.03}O_{4.1}$ (Compound C-6)
$Li_{1.02}Mn_{1.95}Na_{0.05}O_4$ (Compound C-7)
$Li_{1.02}Mn_{1.95}Nb_{0.02}O_{4.1}$ (Compound C-8)

The procedures of (1) above were repeated using independently $Fe_2O_3$, $Cr_2O_3$, CuO, $Al_2O_3$, MgO, $Na_2CO_3$, and $Nd_2O_3$ in place of cobalt carbonate, to give the above-mentioned compounds C-2 to C-8.

(4) $Li_2CoO_2$ (Compound C-9; sub-active material for positive electrode)

A mixture of $Co_3O_4$ and $Co_2O_3$ and lithium carbonate were mixed in a molar ratio of 1.05 (Li/Co). The resulting mixture was fired at 600° C. for 4 hours and subsequently at 880° C. for 8 hours in an atmospheric condition. The fired product was pulverized in an automatic mortar to give a powdery product having a median size of 6 μm and BET specific surface area of 0.5 m²/g. X-Ray diffraction analysis indicated that the fired product was $LiCoO_2$. pH value determined in the above-described method was 10.5.

(5) $LiNi_{0.8}Co_{0.2}O_2$ (Compound C-10; sub-active material for positive electrode)

Nickel hydroxide was added to the mixture of the (4) above and firing was performed at 800° C. for 48 hours in an oxygen atmosphere to give the $LiNi_{0.8}Co_{0.2}O_2$.

Preparation of Electrode Mixture Sheet (1) Positive electrode mixture sheet

The compound C-1 (87 wt. %), flake graphite (6 wt. %), acetylene black (3 wt. %), and a binder (composition of 3 wt. % of polytetrafluoroethylene in water and 1 wt. % of sodium polyacrylate) were kneaded after addition of water. The resulting slurry was coated on both sides of an aluminum film (thickness: 30 $\mu$m). The coated aluminum film was dried and pressed to give the desired positive electrode mixture sheet (coated amount: approximately 340 g/m$^2$, thickness: approximately 120 $\mu$m).

(2) Negative electrode mixture sheet

The compound A-1 (86 wt. %), flake graphite (6 wt. %), acetylene black (3 wt. %), and a binder (composition of 4 wt. % of styrene-butadiene rubber in water and 1 wt. % of carboxymethyl cellulose) were kneaded after addition of water. The resulting slurry was coated on both sides of a copper film (thickness: 18 $\mu$m). The coated copper film was dried and pressed to give the desired negative electrode mixture sheet (coated amount: approximately 70 g/m$^2$, thickness: approximately 30 $\mu$m).

Preparation of Secondary Battery of Cylinder Form

[Referential Battery No. 1]

The positive electrode mixture sheet obtained above was cut to give a strip having a width of 35 mm, and the negative electrode mixture sheet obtained above was cut to give a strip having a width of 39 mm. To the ends of respective sheets were spot-welded leading plates of aluminum and nickel, respectively, and dehydrated and dried at 150° C. for 2 hours in a dry atmospheric condition of a dew point of −40° C.

Both electrode sheets were installed in a nickel-plated iron cylinder battery container, in the manner as illustrated in the attached FIGURE. The separator was a porous polypropylene film (Cellgard 2400, available from Cellanese Corporation). In the container which also served as the negative electrode terminal, an electrolytic solution of 1 mole of LiPF$_6$ in one liter of a mixture of ethylene carbonate, butylene carbonate and dimethyl carbonate (2:2:6, volume ratio) was placed. The battery cap was fixed via a gasket. The positive electrode terminal and the positive electrode mixture sheet, as well as the negative electrode terminal and the container, were connected to each other.

The resulting battery composition (which was a battery precursor) had a diameter of 14 mm and a height of 50 mm. The battery was equipped with a safety valve.

[Referential Batteries No. 2 to No. 10]

Referential batteries No. 2 to No. 10 were prepared in the same manner as above, except that the compound C-1 was replaced with one of the compounds C-2 to C-8, or a combination of the compounds C-1 and C-9 (2:1, by weight), or a combination of the compounds C-1 and C-10 (2:1, by weight), and the compound A-1 was replaced with the compound A-2 or A-3, as is set forth in Table 2.

[Battery Precursor Nos. 11 to 15, according to Invention]

A lithium metal foil of 30 $\mu$m thick was sliced to give a strip of 20 mm (width) and 320 mm (length). It weighed approximately 100 mg. In a dry atmospheric condition (dew point: −60° C.), the lithium strip was placed on both surfaces of layers of the compound C-2, C-3, or C-4 of the positive electrode mixture sheet at certain spaces, and then the lithium strip was pressed onto the surfaces using a press roller.

The same lithium metal foil was sliced to give a strip of 14 mm (width) and 320 mm (length). It weighed approximately 70 mg. The lithium strip was placed on both surfaces of layers of a combination of the compounds C-1 and C-9 (2:1, by weight), or a combination of the compounds C-1 and C-10 (2:1, by weight) of the positive electrode mixture sheet at certain spaces, and then the lithium strip was pressed onto the surfaces using a press roller.

Thus prepared positive electrode mixture sheet equipped with lithium metal strips was placed together with other materials (i.e., negative electrode precursor sheet and non-aqueous electrolyte) in the container in the same manner as in the preparation of Referential Battery, to give a lithium ion secondary battery precursor (Nos. 11 to 15) according to the invention.

[Battery Precursor Nos. 16 to 25 according to Invention]

On the surface of the coated layer of the positive electrode mixture sheet, a mixture of flake graphite and aluminum oxide (1:4, weight ratio) was coated to give an electroconductive protective layer (mean thickness: 10 $\mu$m). On the surface of the protective layer was placed and fixed the same lithium metal strip (thickness 30 $\mu$m, width: 20 mm, length: 320 mm, weight: approximately 100 mg), in the same manner as above.

Thus prepared positive electrode mixture sheet equipped with lithium metal strips on the protective layer was placed together with other materials in the container, to give a lithium ion secondary battery precursor (Nos. 16 to 25) according to the invention.

[Battery Precursor Nos. 26 & 30 according to Invention]

On an exposed area of the surface of the aluminum film (i.e., collector) of the positive electrode mixture sheet, an electroconductive carbon was deposited in vacuum to give a carbon deposited layer of 10 $\mu$m thick. Onto the carbon deposited layer was pressed a lithium metal foil (100 mg) of 200 $\mu$m thick using a press roller.

Thus, a positive electrode mixture sheet provided with a lithium metal on its collector surface was prepared.

Thus prepared positive electrode mixture sheet provided with lithium metal was placed together with other materials in the container, to give a lithium ion secondary battery precursor (Nos. 26 and 30) according to the invention.

[Preparation of lithium ion secondary batteries]

Each of the referential secondary battery precursor (having a positive electrode sheet with no lithium metal) and the secondary battery precursor of the invention (having a positive electrode sheet with lithium metal) was allowed to stand overnight at room temperature and then was preliminarily charged to 3.0 V. The battery precursor was then aged at 40° C. for 7 days and charged to 4.2 V for activating the battery precursor.

The above-mentioned activation of the positive electrode of the battery precursor was sufficiently performed until the composition of the active material was turned to have the formula of Li$_{0.05-0.20}$Mn$_{2-a}$M$_{a/c}$O$_4$. When the activation was made so insufficiently as to give the formula of Li$_{>0.30}$Mn$_{2-a}$M$_{a/c}$O$_4$, the discharge capacity of the battery precursor greatly decreased by more than 30%.

Evaluation of Lithium Ion Secondary Battery

The above lithium ion secondary battery was once dicharged, and then was evaluated in its discharge capacity and cycle capacity retention by repeated charge-discharge cycles under the conditions that the voltage at which the charge was stopped at 4.2 volts, the voltage at which the discharge was stopped at 2.8 volts, and electric currents for the charge-discharge were 1 mA/cm$^2$.

Table 2 indicates the combinations of the precursors of the positive and negative electrode active materials, the discharge capacity, and the cycle capacity retention (% after 100 cycles).

Table 3 indicates that the variation of the compositions of the lithium manganese oxides in some battery samples. The variation was determined by breaking down the battery precursor before the charge was started just after the aging, using ICP emission analysis and X-ray diffraction measurement. The same analysis and measurement were again performed on the battery after the repeated discharge-charge cycles which were conducted after the initial charging of the precursor up to 4.2 volts.

TABLE 2

| No. | Positive electrode (Li) | Negative electrode | Discharge capacity (Ah) | Cycle Capacity retention (%) |
|---|---|---|---|---|
| | | Referential | | |
| 0 | C-0 (none) | A-1 | 0.45 | 80 |
| 1 | C-1 (none) | A-1 | 0.42 | 91 |
| 2 | C-2 (none) | A-3 | 0.43 | 90 |
| 3 | C-3 (none) | A-2 | 0.44 | 89 |
| 4 | C-4 (none) | A-1 | 0.41 | 92 |
| 5 | C-5 (none) | A-3 | 0.42 | 92 |
| 6 | C-6 (none) | A-2 | 0.43 | 91 |
| 7 | C-7 (none) | A-1 | 0.40 | 90 |
| 8 | C-8 (none) | A-3 | 0.41 | 92 |
| 9 | C-1/9 (none) | A-1 | 0.43 | 89 |
| 10 | C-1/10 (none) | A-1 | 0.42 | 87 |
| | Invention (Li-deposited on the active material) | | | |
| 11 | C-2 (Li) | A-1 | 0.49 | 90 |
| 12 | C-3 (Li) | A-3 | 0.47 | 90 |
| 13 | C-4 (Li) | A-2 | 0.48 | 89 |
| 14 | C-1/9 (Li) | A-1 | 0.55 | 88 |
| 15 | C-1/10 (Li) | A-1 | 0.56 | 85 |
| | Invention (Li-deposited on the protective layer) | | | |
| 16 | C-1 (Li) | A-1 | 0.50 | 93 |
| 17 | C-2 (Li) | A-3 | 0.48 | 93 |
| 18 | C-3 (Li) | A-2 | 0.50 | 91 |
| 19 | C-4 (Li) | A-1 | 0.50 | 94 |
| 20 | C-5 (Li) | A-3 | 0.49 | 93 |
| 21 | C-6 (Li) | A-2 | 0.50 | 90 |
| 22 | C-7 (Li) | A-1 | 0.51 | 89 |
| 23 | C-8 (Li) | A-3 | 0.50 | 92 |
| 24 | C-1/9 (Li) | A-1 | 0.56 | 89 |
| 25 | C-1/10 (Li) | A-1 | 0.56 | 88 |
| | Invention (Li-deposited on the collector) | | | |
| 26 | C-1 (Li) | A-1 | 0.50 | 88 |
| 27 | C-2 (Li) | A-3 | 0.49 | 89 |
| 28 | C-3 (Li) | A-2 | 0.50 | 89 |
| 29 | C-1/9 (Li) | A-1 | 0.55 | 86 |
| 30 | C-1/10 (Li) | A-1 | 0.53 | 85 |

The results set forth in Table 2 indicate that the lithium ion secondary battery of the invention produced from the battery precursor Nos. 11 to 30 which utilized a positive electrode active material precursor comprising the lithium manganese-metal complex oxide and the deposited lithium metal are superior in the discharge capacity and cycle capacity retention to the referential lithium ion secondary battery produced from the battery precursors No. 1 to 10 which utilized a positive electrode active material precursor comprising the lithium manganese-metal complex oxide and no deposited lithium metal.

TABLE 3

| Battery No. | Positive Electrode Active Material Precursor (self-discharged) | Variation in the charge-discharge cycles |
|---|---|---|
| | Referential battery | |
| 1 | $Li_{1.05}Mn_{1.95}Co_{0.02}O_{4.2}$ | $Li_{1.15-0.90}Mn_{1.95}Co_{0.02}O_{4.2}$ |
| 2 | $Li_{1.05}Mn_{1.95}Fe_{0.02}O_{4.2}$ | $Li_{1.15-0.90}Mn_{1.95}Fe_{0.02}O_{4.2}$ |
| 8 | $Li_{1.05}Mn_{1.95}Nb_{0.02}O_{4.1}$ | $Li_{1.10-0.85}Mn_{1.95}Nb_{0.02}O_{4.1}$ |
| | Battery of Invention | |
| 11 | $Li_{1.7}Mn_{1.95}Fe_{0.02}O_{4.2}$ | $Li_{1.13-0.90}Mn_{1.95}Cr_{0.02}O_{4.2}$ |
| 12 | $Li_{1.7}Mn_{1.95}Cr_{0.02}O_{4.2}$ | $Li_{1.13-0.90}Mn_{1.95}Cr_{0.02}O_{4.2}$ |
| 16 | $Li_{1.7}Mn_{1.95}Co_{0.02}O_{4.2}$ | $Li_{1.13-0.90}Mn_{1.95}Co_{0.02}O_{4.2}$ |
| 17 | $Li_{1.7}Mn_{1.95}Fe_{0.02}O_{4.2}$ | $Li_{1.13-0.90}Mn_{1.95}Fe_{0.02}O_{4.2}$ |
| 23 | $Li_{1.7}Mn_{1.95}Nb_{0.02}O_{4.2}$ | $Li_{1.13-0.90}Mn_{1.95}Nb_{0.02}O_{4.1}$ |

Preparation of Secondary Battery of Cylinder Form

[Battery Precursor Nos. 31 to 35 according to Invention]

A lithium metal foil of 35 μm thick was sliced to give a strip of 20 mm (width) and 320 mm (length). It weighed approximately 100 mg. In a dry atmospheric condition (dew point: −60° C.), the lithium strip was placed on both surfaces of layers of the compound A-1, A-2 or A-3 of the negative electrode mixture sheet, and then the lithium strip was pressed onto the surfaces using a press roller.

Thus prepared negative electrode mixture sheet equipped with lithium metal strips was placed together with other materials in the container in the same manner as above, to give a lithium ion secondary battery precursor (Nos. 31 to 35) according to the invention.

[Battery Precursor Nos. 36 to 45 according to Invention]

On the surface of the coated layer of the negative electrode mixture sheet, a mixture of flake graphite and aluminum oxide (1:4, weight ratio) was coated to give an electroconductive protective layer (mean thickness: 5 μm). On the surface of the protective layer was placed and fixed the same lithium metal strip (thickness: 35 μm, width: 20 mm, length: 320 mm, weight: approximately 100 mg).

Thus prepared negative electrode mixture sheet equipped with lithium metal strips on the protective layer was placed together with other materials in the container, to give a lithium ion secondary battery precursor (Nos. 36 to 45) according to the invention.

[Battery Precursor Nos. 46 & 50 according to Invention]

Onto an exposed area of the surface of the cupper film (i.e., collector) of the negative electrode mixture sheet, was pressed a lithium metal foil (100 mg) having a thickness of 200 μm using a press roller. Thus, a negative electrode mixture sheet provided with a lithium metal on its collector surface was prepared.

Thus prepared negative electrode mixture sheet provided with lithium metal was placed in the container together with other material, to give a lithium ion secondary battery precursor (Nos. 46 and 50) according to the invention.

[Preparation of lithium ion secondary batteries]

The secondary battery precursor of the invention (having a negative electrode sheet with lithium metal) was allowed to stand 5 hours at room temperature and then was discharged at a constant electric current of 0.2 A. Thus discharged battery precursor was then aged at 40° C. for 7 days and charged to 4.2 V for activating the battery precursor.

The above-mentioned activation of the positive electrode of the battery precursor was sufficiently performed until the composition of the active material was turned to have the formula of $Li_{0.05-4\ 0.20}Mn_{2-a}M_{a/c}O_4$. When the activation was made so insufficiently to give the formula of $Li_{>0.30}Mn_{2-a}M_{a/c}O_4$, the discharge capacity of the battery precursor greatly decreased by more than 30%.

Evaluation of Lithium Ion Secondary Battery

The above lithium ion secondary battery was once dicharged, and then was evaluated in its discharge capacity and cycle capacity retention by repeated charge-discharge cycles under the conditions that the voltage at which the charge was stopped at 4.2 volts, the voltage at which the discharge was stopped at 2.8 volts, and electric currents for the charge-discharge were 1 mA/cm².

Table 4 indicates the combinations of the precursors of the positive and negative electrode active materials, the discharge capacity, and the cycle capacity retention (% after 100 cycles).

Table 5 indicates that the variation of the compositions of the lithium manganese oxides in some battery samples. The variation was determined by breaking down the battery precursor before the charge was started just after the aging, using ICP emission analysis and X-ray diffraction measurement. The same analysis and measurement were again performed on the battery after the repeated discharge-charge cycles which were conducted after the initial charging of the precursor up to 4.2 volts.

TABLE 4

| No. | Negative electrode (Li) | Positive electrode | Discharge capacity (Ah) | Cycle Capacity retention (%) |
|---|---|---|---|---|
| Invention (Li-deposited on the active material) | | | | |
| 31 | A-1 (Li) | C-1 | 0.50 | 90 |
| 32 | A-3 (Li) | C-2 | 0.48 | 90 |
| 33 | A-2 (Li) | C-3 | ).49 | 89 |
| 34 | A-1 (Li) | C-1/9 | 0.55 | 88 |
| 35 | A-1 (Li) | C-1/10 | 0.56 | 85 |
| Invention (Li-deposited on the protective layer) | | | | |
| 36 | A-1 (Li) | C-1 | 0.51 | 93 |
| 37 | A-3 (Li) | C-2 | 0.49 | 93 |
| 38 | A-2 (Li) | C-3 | ).51 | 91 |
| 39 | A-1 (Li) | C-4 | 0.51 | 94 |
| 40 | A-3 (Li) | C-5 | 0.50 | 93 |
| 41 | A-2 (Li) | C-6 | 0.51 | 90 |
| 42 | A-1 (Li) | C-7 | 0.52 | 93 |
| 43 | A-3 (Li) | C-8 | 0.51 | 92 |
| 44 | A-1 (Li) | C-1/9 | 0.57 | 89 |
| 45 | A-1 (Li) | C-1/10 | 0.57 | 88 |
| Invention (Li-deposited on the collector) | | | | |
| 46 | A-1 (Li) | C-1 | 0.51 | 88 |
| 47 | A-3 (Li) | C-2 | 0.50 | 89 |
| 48 | A-2 (Li) | C-3 | 0.51 | 89 |
| 49 | A-1 (Li) | C-1/9 | 0.56 | 86 |
| 50 | A-1 (Li) | C-1/10 | 0.54 | 85 |

The results set forth in Table 4 indicate that the lithium ion secondary battery of the invention produced from the battery precursor Nos. 31 to 50 which utilized a negative electrode active material precursor comprising the metal oxide and the deposited lithium metal are superior in the discharge capacity and cycle capacity retention to the referential lithium ion secondary battery produced from the battery precursors No. 1 to 10 (set forth in Table 2).

TABLE 5

| Battery No. | Positive Electrode Active Material Precursor (self-discharged) | Variation in the charge-discharge cycles |
|---|---|---|
| Referential battery | | |
| 31 | $Li_{1.7}Mn_{1.95}Co_{0.05}O_4$ | $Li_{1.13-0.90}Mn_{1.95}Co_{0.05}O_4$ |
| 32 | $Li_{1.7}Mn_{1.95}Fe_{0.05}O_4$ | $Li_{1.13-0.90}Mn_{1.95}Fe_{0.05}O_4$ |
| 36 | $Li_{1.7}Mn_{1.95}Co_{0.05}O_4$ | $Li_{1.12-0.90}Mn_{1.95}Co_{0.05}O_4$ |
| 37 | $Li_{1.7}Mn_{1.95}Fe_{0.05}O_4$ | $Li_{1.12-0.90}Mn_{1.95}Fe_{0.05}O_4$ |
| 43 | $Li_{1.7}Mn_{1.95}Nb_{0.05}O_4$ | $Li_{1.10-0.90}Mn_{1.95}Nb_{0.05}O_4$ |

What is claimed is:

1. A process for preparing a lithium ion secondary battery which comprises electrically charging a non-aqueous secondary battery precursor comprising a positive electrode active material precursor of the formula (II):

$$Li_{I+x}Mn_{2-a}M_{a/c}O_{4+b} \quad (II)$$

wherein M is a cation of a transition metal selected from the group consisting of Co, Ni, Fe, Cr, Cu, Ti, Zr, Nb and Y; x, a and b are numbers satisfying the conditions of 0.3<x<1.2, 0<a≦1.0, and 0≦b<0.4, respectively; and c is a number of 1 to 4, a negative electrode active material precursor, a non-aqueous electrolyte, and a container sealing the electrode precursors and electrolyte therein, to convert the positive electrode active material precursor into a positive electrode active material of the formula (I):

$$Li_yMn_{2-a}M_{a/c}O_{4+b} \quad (I)$$

wherein M, a, b and c are the same as above, and y is a number satisfying the condition of 0<y≦1.0, and the negative electrode active material precursor into a negative electrode active material having a lithium ion inserted therein.

2. The process of claim 1, wherein the negative electrode active material precursor contains essentially no lithium.

3. The process of claim 1, wherein the negative electrode active material precursor comprises an amorphous metal complex oxide.

4. The process of claim 1, wherein y in the formula (I) is under condition of 0<y≦0.9.

* * * * *